4
2,866,765

LUBRICATING INK COMPOSITION, PROCESS FOR COATING A POLYMER SURFACE THEREWITH, AND RESULTING ARTICLES

Richard A. Smith, Cornwall-on-Hudson, N. Y., assignor, by mesne assignments, to Minnesota Mining and Manufacturing Company, St. Paul, Minn., a corporation of Delaware No Drawing. Application March 5, 1954
Serial No. 414,510

28 Claims. (Cl. 260—30.4)

This invention relates to halogen-containing plastics. In one of its aspects, this invention relates to a composition suitable for applying a lubricating or anti-friction surface to halogenated polymers. In another of its aspects, this invention relates to a process for improving the anti-friction properties of halogenated thermoplastic polymers. In one of its more particular aspects, this invention relates to a composition which will impart a lubricating surface to polymers of trifluorochloroethylene and tetrafluoroethylene and to a process for applying the composition.

Because of their unusual chemical and physical characteristics, the fluorine-containing thermoplastic polymers are widely used in numerous industrial applications. Among the most outstanding of the properties of the fluorine-containing thermoplastic polymers, such as polymers of trifluorochloroethylene and tetrafluoroethylene, is chemical inertness. Therefore, these polymers may be exposed to a wide variety of oxidizing, reducing and solvent-type reagents, such as fuming nitric acid, hydrazine and aniline with no apparent effect on the polymer. In addition to their high degree of chemical stability, these polymers possess high thermal stability, excellent electrical properties and are readily molded into various useful items.

In many applications in which these polymers are employed, the physical characteristics of the polymer are such, that friction is not too serious a problem. Some of the fluorinated polymers, such as tetrafluoroethylene, are almost self lubricating. To some extent, this is also true of polymers of trifluorochloroethylene. However, in many applications friction is a serious problem and, whatever inherent lubricating properties the polymer itself may possess, an anti-friction agent must nevertheless be employed. For example, polymers of trifluorochloroethylene and tetrafluoroethylene are widely used as gaskets, valve seats, etc., or, in general, under conditions such that they are subjected to the abrasive effect of other materials, for example, steel. In some instances, the lubricating or anti-friction resistant properties of the polymer have been improved by incorporating an anti-friction agent within the polymer-mass prior to molding of the polymer. While this technique has alleviated the problem to some extent, the presence of the anti-friction agent within the polymer has a detrimental effect on the polymer and limits its use. Polymers which contain anti-friction agents intimately dispersed through their mass, have improved anti-friction properties but suffer the same loss in physical characteristics that any polymer does when a filler is incorporated therein.

It is an object of this invention, to provide a composition which can be used to imbed a lubricating or anti-friction surface in the surface of halogen containing plastics.

It is another object of this invention, to provide a resin based composition which can be used to bond a lubricant to the surface of a halogen containing plastic.

It is another object of this invention, to provide a means for adhesively bonding an anti-friction agent to the surface of a halogen containing plastic which bonding can be effected at or near room temperature.

It is one of the more particular objects of this invention, to provide a composition which can be used to bond an anti-friction agent to the surface of polymers of trifluorochloroethylene and tetrafluoroethylene.

Various other objects and advantages of the present invention will become apparent to those skilled in the art or reading the accompanying description and disclosure.

In general, the above objects are accomplished by applying to the surface of the polymer whose anti-friction properties are to be improved, a lubricating composition which comprises an anti-friction agent admixed with a solution of a copolymer of trifluorochloroethylene in an oxygenated organic solvent. Because the lubricating composition of this invention can be applied by employing techniques which are similar to those used in applying ink compositions, it will hereinafter be referred to as a lubricating or anti-friction ink.

The copolymers of trifluorochloroethylene which are used as binders in the lubricating inks of this invention, are normally solid, have softening points above about 150° C. and are soluble in oxygenated organic solvents. This group contemplates trifluorochloroethylene copolymerized with halogenated olefins, such as vinyl fluoride, vinylidene fluoride, vinyl chloride, vinylidene chloride, 1,1-fluoroethylene and trifluoroethylene. A particularly suitable binder, is a copolymer of trifluorochloroethylene and vinylidene fluoride, wherein trifluorochloroethylene is present in an amount between about 5 and about 95 mol percent. Preferably, the trifluorochloroethylene-vinylidene fluoride copolymers contain trifluorochloroethylene in an amount between about 20 and about 80 mol percent. The characteristics of the binder are dependent upon the mol concentration of trifluorochloroethylene. Thus, if between about 20 and about 69 mol percent of trifluorochloroethylene preferably about 50 mol percent is present the binder will have properties characteristic of elastomeric materials, whereas if above 69 and not higher than 80 mol percent of trifluorochloroethylene preferably about 75 mol percent is present, the binder will have the characteristics of a resinous material. In most applications, the preferred anti-friction agent binder is that which has resinous properties, that is a copolymer containing trifluorochloroethylene in an amount above 69 and not higher than 80 mol percent.

Since the process of this invention relates to new and novel lubricating compositions, their properties and use unnecessarily detailed description of the methods of preparation of the binder is not warranted. Therefore, only methods of preparation of the preferred resinous and elastomeric binders are given, although by employing substantially identical polymerization systems, but with different monomer feed ratios and polymerization time any copolymer, in the range contemplated by this invention, may be prepared.

The preferred resinous binder may be prepared by the procedure given below using the following water-suspension type recipe.

| | Parts by weight |
|---|---|
| Water, distilled | 200. |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water.

Next, 0.8 part of $Na_2S_2O_5$ were dissolved in another 20 parts of water. In still another 20 parts of water, 0.2 part of $FeSO_4.7H_2O$ was dissolved. 140 parts of water were next charged to a silver-lined steel bomb. The aforementioned $(NH_4)_2S_2O_8$, $Na_2S_2O_5$, and the $FeSO_4.7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol per cent of $CF_2=CFCl$, combined in the resulting copolymeric product was 75 percent.

The preferred elastomeric binder may be prepared using the following water-suspension type recipe.

| | Parts by weight |
|---|---|
| Water, distilled | 200. |
| $CF_2=CFCl$ | [1] 64.5 |
| $CF_2=CH_2$ | [1] 35.5 |
| $K_2S_2O_8$ | 1.0 |
| $Na_2S_2O_5$ | 0.4 |
| $FeSO_4.7H_2O$ | 0.1 |

[1] 50/50 molar.

Catalyst and activator solution was prepared by dissolving 1 part of $K_2S_2O_8$ in 20 parts of water. In still another 20 parts of water, 0.1 part of $FeSO_4.7H_2O$ was dissolved. 140 parts of water were next charged to a silver-lined steel bomb. The aforementioned $K_2S_2O_8$, $Na_2S_2O_5$, and the $FeSO_4.7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried at vacuo at room temperature. The mol percent of $CF_2=CFCl$ combined in the resulting copolymeric product was 49 percent.

In the formulation of the lubricating inks of this invention, a variety of solid, inorganic anti-friction agents may be employed. The anti-friction agent should be compatible with the binder of this invention and with the polymer to which it is applied and further, should be stable under intended conditions of use. In addition, selection of the anti-friction agent is based on the relative hardness of the components which are in contact. Thus, if the polymer is to be contacted by a harder component e. g. steel then anti-friction agents such as graphite, molybdenum sulfide, mica and talc are employed, whereas if the polymer is to be in contact with a soft material then antifriction agents which harden the surface of the polymer, such as chromium, lead etc. are employed. Of the above enumerated anti-friction agents mica and talc are not generally preferred because of their low mechanical strength and poor adherence. The anti-friction agent may be in the form of flakes, granules or small pieces. In any form, the particle size should not exceed 0.01 inch in diameter since adherence will be adversely affected. Particle size preferably should be below 0.005 inch and in order to secure maximum adhesion below 0.003 inch.

In preparing the lubricating compositions of this invention, the copolymer binder is preferably dissolved in a solvent. Suitable solvents or thinners are the oxygenated organic solvents in some of which the binder is completely soluble, while in others it is partially soluble. Thus, the binder is completely soluble in tetrahydrofuran, tetrahydro-2-methyl furan, tetrahydropyran 3-chlorotetrahydrofuran and dioxane. Among the solvents in which the binder is partially soluble, are ethyl acetate, isobutyl propionate, amyl acetate, methyl ethyl ketone, isophorone, di-isobutyl ketone, cyclohexanone, mesityl oxide, 1-chloro 1-nitroethane and 2-chloro 2-nitropropane. These latter solvents when mixed with a solvent in which the binder is completely soluble, will form a solvent mixture which will completely dissolve the binder. The use of solvent mixtures is desirable in order to control drying rate. A particularly suitable solvent is tetrahydrofuran; a particularly suitable mixture is tetrahydrofuran and dioxane. Preferably equal amounts by volume of each solvent constitute the mixture although the solvent in which the binder is completely soluble may constitute from about 25 percent to about 95 percent of the mixture.

As indicated previously, in compounding of the inks of this invention, the binder is preferably first dissolved in a suitable solvent, such as tetrahydrofuran after which the anti-friction agent is admixed with the dissolved binder. Admixture of the anti-friction agent with the dissolved binder may be effected by using any of the conventional mixing and blending equipment, such as a three roll paint mill, colloid mill, and pebble mill, etc. The range of concentration of the various ingredients of the lubricating ink will vary over relatively wide limits depending upon the amount of lubricant which is to be applied, the use for which the lubricated surface is intended and the method by which the ink is to be applied. Generally, the ratio of binder to anti-friction agent will be between about 20:1 and about 1:2. Preferably, the ratio will be between about 10:1 and about 1:1, while a particularly suitable ratio is between about 4:1 and about 2:1. The solvent or thinner is used in an amount between about 25 percent and about 99 percent by weight depending particularly on the process which is to be used in applying the ink. A particularly suitable concentration of solvent is between about 50 percent and about 95 percent. Obviously, a solvent is required where the method of application is based on the use of liquids. However, some methods of application are best suited to the use of solid compositions, for example, the hot stamp process. In this instance, a solvent free film containing within its mass the anti-friction agent and having a thickness between about 1 and about 5 mils may be used.

The copolymers which serve as a binder for the ink of this invention, may be treated in such a way as to induce cross-linking of the polymer chain after the ink has been applied. This cross-linking modifies the properties of the copolymer and enhances its suitability for use in certain applications. The cross-linked polymers are usually insoluble but may swell in solvent, have increased strength, toughness, heat resistance, less tendency to offset and greater chemical resistance. Generally, cross-linking of the copolymeric binders which are used in the inks of this invention, is effected by incorporating within the copolymer a cross-linking agent which may be a peroxy-type compound, a basic metal oxide or an inorganic polysulfide. The peroxy-type compounds include both organic and inorganic compounds which contain oxygen atoms directly linked to oxygen atoms, and should be stable below about 50° C. or else they will cause cross-linking while they are being blended into the copolymer. Among the organic compounds are the alkyl and acyl peroxides and hydroperoxides such as, ditertiary butyl peroxide, di-lauryl peroxide, di-benzoyl peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds, are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the polymer containing cross-linking agent be heated for a period of time. Generally, the polymer is heated at a temperature between about 100° C. and about 200° C., depending upon the decomposition temperature of the cross-linking agent, for a period of time between about 1 hour and about 48 hours. Since the incorporation of the cross-linking agent within the copolymer is usually effected by mechanical means which generate heat, the cross-linking agent is preferably added last, that is after the anti-friction agent has been dispersed. A particularly valuable cross-linking reaction employing diamines, such as ethylene diamine, diethylene triamine, hexamethylene diamine, diamino stilbene, etc. is described in the prior and copending application of Fred W. West, Serial No. 372,159, filed August 3, 1953.

In order to illustrate the process of this invention, the following examples of lubricating ink formulations are presented below. Unless otherwise indicated, concentration is given in parts by weight. These data are offered for purposes of illustration and are not to be construed as unnecessarily limiting to the invention.

*Example I*

Approximately 10 percent of a copolymer of trifluorochloroethylene and vinylidene fluoride (75:25 mol ratio) was dissolved in tetrahydrofuran. To this solution 10 percent of molybdenum sulfide, based on the weight of the copolymer, was added. The resulting suspension was blended on a three roll paint mill. A homopolymer of trifluorochloroethylene was coated with the above described suspension and set at a temperature of about 250° C. for 40 minutes. The surface was examined and found to possess excellent anti-friction characteristics.

*Example II*

The process of Example I was repeated except that 6 coatings were applied with heating between each coat. A heavy anti-friction surface was thus applied to the polymer surface.

*Example III*

The process of Example I was repeated except that the applied lubricating composition was allowed to air-dry. The lubricating surface was similar to the surface of Example I.

*Example IV*

The composition described in Example I was applied to a laminate of a homopolymer of trifluorochloroethylene and glass cloth. The lubricating composition was force-dried by heating at 150° C. for 30 minutes. The lubricating properties of the polymer surface were excellent.

*Example V*

Approximately 10 percent of a copolymer of trifluorochloroethylene and vinylidene fluoride (75:25 mol ratio) was dissolved in tetrahydrofuran. Approximately 10 percent of graphite, based on the weight of the copolymer, was added to the solution and blended in a three roll paint mill. This composition was applied to the surface of a homopolymer of trifluorochloroethylene and force-dried as in Example I. The anti-friction properties of the treated polymer surface were excellent.

*Example VI*

The composition of Example V was applied to a homopolymer of tetrafluoroethylene and set by heating as described above in Example I. The anti-friction properties of tetrafluoroethylene were greatly improved. Adhesion of the lubricating composition was excellent.

Each of the above surfaces was carefully examined with respect to the adhesive characteristics of the lubricating or anti-friction agent and with respect to resistance to abrasion. All surfaces so examined were found to be excellent in every respect. Examination was made by fixing adhesion cellophane tape over the lubricating surface and then quickly removing the cellophane tape and noting whether or not any of the lubricant adhered to the tape. Abrasion-resistance was determined by rubbing the surface with an eraser and with a coarse cloth. Examination of cross-sections of the applied anti-friction surface established that the anti-friction agent was firmly bonded to the surface of the polymer to which it was applied when the lubricating ink was allowed to air dry or was force-dried below 200° C. and that the lubricating agent slightly penetrated the surface when the ink was set at a temperature above 200° C. Thus, depending on the conditions of use the anti-friction agent may be adhered to the surface of the polymer by heating at a temperature between about 100° C. and about 200° C. for a period of time between about 1 second and 60 minutes—a longer time being usually employed at a lower temperature or the anti-friction agent may be imbedded in the polymer by heating above 200° C. and below 300° C. for a period of time between 1 minute and 50 minutes. In the first instance i. e. when heated below 200° C. the copolymeric binder is firmly bonded or adhered to the surface of the polymer to which it is applied whereas when heated above 200° C. the copolymer dissolves in the contiguous layer of the polymer to which it was applied and carries the anti-friction agent slightly below the surface.

While the lubricating compositions of this invention are primarily intended for use with polymers of trifluorochloroethylene and tetrafluoroethylene and while the use of these inks has been described with particular reference thereto, it is to be understood and is therefore within the scope of this invention that these lubricating inks may also be applied to polymers of vinyl chloride, vinylidene chloride, vinyl fluoride or in general to any solid thermoplastic halogenated polymer.

Various alterations and modifications of the invention and its aspects may become apparent to those skilled in the art without departing from the scope of this invention.

Having thus described my invention, I claim:

1. A novel lubricating ink composition which comprises an admixture of a solid inorganic anti-friction agent and a normally solid copolymer of trifluorochloroethylene and another halogenated olefin said copolymer having a softening point above about 150° C. and being soluble in an oxygenated organic solvent selected from the group consisting of tetrahydrofuran, tetrahydro-2-methyl furan, tetrahydropyran, 3-chlorotetrahydrofuran, and dioxane.

2. The composition of claim 1 in which the anti-friction agent is molybdenum sulfide.

3. The composition of claim 1 in which the anti-friction agent is graphite.

4. The composition of claim 1 in which the anti-friction agent is chromium.

5. The composition of claim 1 in which the anti-friction agent is lead.

6. The composition of claim 1 in which the anti-friction agent is talc.

7. A novel lubricating ink composition which comprises an admixture of a solid, inorganic anti-friction agent and a solution in an oxygenated organic solvent of a normally solid soluble copolymer of trifluorochloroethylene and vinylidene fluoride said copolymer having a softening point above about 150° C., said solvent being selected from the group consisting of tetrahydrofuran, tetrahydro-2-methyl furan, tetrahydropyran, 3-chlorotetrahydrofuran and dioxane.

8. The composition of claim 7 wherein the solvent is tetrahydrofuran.

9. The composition of claim 7 wherein the solvent is tetrahydro-2-methyl furan.

10. The composition of claim 7 wherein the solvent is dioxane.

11. A novel lubricating ink composition which comprises an admixture of a solid, inorganic anti-friction agent and a solution in an oxygenated organic solvent of a normally solid soluble copolymer containing between about 5 and about 95 mol percent of trifluorochloroethylene copolymerized with vinylidene fluoride, said copolymer having a softening point above about 150° C., said solvent being selected from the group consisting of tetrahydrofuran, tetrahydro-2-methyl furan, tetrahydropyran, 3-chlorotetrahydrofuran and dioxane.

12. A novel lubricating ink composition which comprises an admixture of a solid, inorganic anti-friction agent and a solution in an oxygenated organic solvent of a normally solid soluble copolymer containing between about 20 and about 80 mol percent of trifluorochloroethylene copolymerized with vinylidene fluoride, said copolymer having a softening point above about 150° C., said solvent being selected from the group consisting of tetrahydrofuran, tetrahydro-2-methyl furan, tetrahydropyran, 3-chlorotetrahydrofuran and dioxane.

13. A novel lubricating ink composition which comprises an admixture of a solid, inorganic anti-friction agent and a solution in an oxygenated organic solvent of a normally solid soluble copolymer containing between about 20 and about 69 mol percent of trifluorochloroethylene copolymerized with vinylidene fluoride, said copolymer having a softening point above about 150° C., said solvent being selected from the group consisting of tetrahydrofuran, tetrahydro-2-methyl furan, tetrahydropyran, 3-chlorotetrahydrofuran and dioxane.

14. A novel lubricating ink composition which comprises an admixture of a solid, inorganic anti-friction agent and a solution in an oxygenated organic solvent of a normally solid soluble copolymer containing above 69 and not higher than 80 mol percent of trifluorochloroethylene copolymerized with vinylidene fluoride, said copolymer having a softening point above about 150° C., said solvent being selected from the group consisting of tetrahydrofuran, tetrahydro-2-methyl furan, tetrahydropyran, 3-chlorotetrahydrofuran and dioxane.

15. A process for improving the anti-friction properties of halogenated thermoplastic polymer surfaces which comprises applying to the surface of said halogenated thermoplastic polymer an ink which comprises an admixture of a solid, inorganic anti-friction agent and a solution of a copolymer of trifluorochloroethylene and another halogenated olefin in an oxygenated organic solvent, said copolymer having a softening point above about 150° C.

16. A process for improving the anti-friction properties of halogenated thermoplastic polymer surfaces which comprises applying to the surface of said halogenated thermoplastic polymer a lubricating ink which comprises an admixture of a solid, inorganic anti-friction agent and a solution in an oxygenated organic solvent of a normally a solution in an oxygenated organic solvent of a normally solid copolymer containing between about 5 and about 95 mol percent of trifluorochloroethylene copolymerized with vinylidene fluoride, said copolymer having a softening point above about 150° C.

17. A process for improving the anti-friction properties of halogenated thermoplastic polymer surfaces which comprises applying to the surface of said halogenated thermoplastic polymer an ink which comprises an admixture of a solid, inorganic anti-friction agent and a solution in an oxygenated organic solvent of a normally solid copolymer containing between about 20 and about 69 mol percent of trifluorochloroethylene copolymerized with vinylidene fluoride, said copolymer having a softening point above about 150° C.

18. A process for improving the anti-friction properties of halogenated thermoplastic polymer surfaces which comprises applying to the surface of said halogenated thermoplastic polymer a lubricating ink which comprises an admixture of an anti-friction agent and a solution in an oxygenated organic solvent of a normally solid copolymer containing between above 69 and not higher than 80 mol percent of trifluorochloroethylene copolymerized with vinylidene fluoride, said copolymer having a softening point above about 150° C.

19. The process of claim 18 wherein the halogenated polymer is trifluorochloroethylene.

20. The process of claim 18 wherein the halogenated polymer is tetrafluoroethylene.

21. A process for improving the anti-friction properties of halogenated thermoplastic polymer surfaces which comprises applying to the surface of said halogenated thermoplastic polymer a lubricating ink which comprises a solid, inorganic anti-friction agent and a solution in an oxygenated organic solvent of a normally solid copolymer containing between about 20 and about 80 mol percent of trifluorochloroethylene copolymerized with vinylidene fluoride, said copolymer having a softening point above about 150° C. and maintaining the lubricating ink and the surface to which it was applied at a temperature between 100° C. and about 300° C. for a period of time between about 1 second and about 60 minutes.

22. A process for improving the anti-friction properties of halogenated thermoplastic polymer surfaces which comprises applying to the surface of said halogenated thermoplastic polymer a lubricating ink which comprises a solid, inorganic anti-friction agent and a solution in an oxygenated organic solvent of a normally solid copolymer having a softening point above about 150° C. containing between above 69 and not higher than 80 mol percent of trifluorochloroethylene copolymerized with vinylidene fluoride and maintaining the lubricating ink and the surface to which it was applied at a temperature between about 200° C. and about 300° C. for a period of time between about 1 minute and about 50 minutes.

23. A process for improving the anti-friction properties of halogenated thermoplastic polymer surfaces which comprises applying to the surface of said halogenated thermoplastic polymer a lubricating ink which comprises a solid, inorganic anti-friction agent and a solution in an oxygenated organic solvent of a normally solid copolymer having a softening point above about 150° C. containing between above 69 and not higher than 80 mol percent of trifluorochloroethylene copolymerized with vinylidene fluoride and maintaining the lubricating ink and the surface to which it was applied at a temperature between about 100° C. and about 200° C. for a period of time between about 1 second and about 60 minutes.

24. A solid thermoplastic polymer of a halogenated olefin surface to which is bonded a lubricating composition comprising a copolymer of trifluorochloroethylene and another halogenated olefin, said copolymer having a softening point above about 150° C. and a solid, inorganic anti-friction agent.

25. A solid polymer of trifluorochloroethylene surface to which is bonded a lubricating composition comprising a copolymer of trifluorochloroethylene and another halogenated olefin, said copolymer having a softening point above about 150° C. and a solid, inorganic anti-friction agent.

26. A solid polymer of tetrafluoroethylene surface to which is bonded a lubricating composition comprising a copolymer of trifluorochloroethylene and another halogenated olefin, said copolymer having a softening point above about 150° C. and a solid, inorganic anti-friction agent.

27. A solid thermoplastic polymer of a halogenated olefin surface to which is bonded a lubricating composition comprising a solid, inorganic anti-friction agent and a copolymer having a softening point above 150° C. and containing between about 20 and about 69 mol percent of trifluorochloroethylene copolymerized with vinylidene fluoride.

28. A solid thermoplastic polymer of a halogenated olefin surface to which is bonded a lubricating composition comprising a solid, inorganic anti-friction agent and a copolymer having a softening point above 150° C. and containing between above 69 and not higher than 80 mol percent of trifluorochloroethylene copolymerized with vinylidene fluoride.

References Cited in the file of this patent

UNITED STATES PATENTS

| | | |
|---|---|---|
| 2,411,159 | Hanford | Nov. 19, 1946 |
| 2,533,425 | Carnell | Dec. 12, 1950 |
| 2,618,574 | Pavlic | Nov. 18, 1952 |
| 2,644,804 | Rubin | July 7, 1953 |
| 2,686,738 | Teeters | Aug. 17, 1954 |
| 2,752,331 | Dittman et al. | June 26, 1956 |

FOREIGN PATENTS

| | | |
|---|---|---|
| 467,677 | Canada | Aug. 29, 1950 |

OTHER REFERENCES

Industrial and Engineering Chemistry, volume 39, No. 3, March 1947, pages 333–337.

UNITED STATES PATENT OFFICE
CERTIFICATE OF CORRECTION

Patent No. 2,866,765                                        December 30, 1958

Richard A. Smith

It is hereby certified that error appears in the printed specification of the above numbered patent requiring correction and that the said Letters Patent should read as corrected below.

Column 6, line 8, for "adhesion" read -- adhesive --; column 8, line 5, for "of an anti-friction" read -- of a solid inorganic anti-friction --.

Signed and sealed this 25th day of August 1959.

(SEAL)
Attest:

KARL H. AXLINE
Attesting Officer

ROBERT C. WATSON
Commissioner of Patents